United States Patent
Kido et al.

(10) Patent No.: US 7,035,665 B2
(45) Date of Patent: Apr. 25, 2006

(54) PORTABLE TERMINAL DEVICE AND WIRELESS COMMUNICATION TERMINAL DEVICE

(75) Inventors: Toru Kido, Tokyo (JP); Satoshi Sugawara, Tokyo (JP)

(73) Assignee: NEC Corporation, Tokyo (JP)

( * ) Notice: Subject to any disclaimer, the term of this patent is extended or adjusted under 35 U.S.C. 154(b) by 568 days.

(21) Appl. No.: 09/790,235

(22) Filed: Feb. 21, 2001

(65) Prior Publication Data

US 2001/0016508 A1 Aug. 23, 2001

(30) Foreign Application Priority Data

Feb. 21, 2000 (JP) ......................................... 2000-043087

(51) Int. Cl.
*H04M 1/00* (2006.01)
*H04M 9/00* (2006.01)

(52) U.S. Cl. ................. 455/556; 455/550.1; 455/575.1; 455/575.8; 379/433.13

(58) Field of Classification Search ................. 455/566, 455/550.1, 575.1, 575.3, 575.8, 556.2; 379/433.13
See application file for complete search history.

(56) References Cited

U.S. PATENT DOCUMENTS

| | | | |
|---|---|---|---|
| 5,477,129 A | 12/1995 | Myslinski | |
| 5,689,400 A | 11/1997 | Ohgami et al. | |
| 5,896,575 A | 4/1999 | Higginbotham et al. | .... 455/566 |
| 6,014,141 A | 1/2000 | Klein | |
| 6,073,033 A | * 6/2000 | Campo | ........................ 455/566 |
| 6,073,187 A | * 6/2000 | Jacobs et al. | .................. 710/14 |
| 6,697,083 B1 | * 2/2004 | Yoon | ........................... 345/658 |

FOREIGN PATENT DOCUMENTS

| | | |
|---|---|---|
| EP | 0 564 092 A2 | 10/1993 |
| EP | 0 866 204 A1 | 9/1998 |
| EP | 0 898 405 A2 | 2/1999 |
| GB | 2 326 051 | 12/1998 |
| JP | 4-49746 | 2/1992 |
| JP | 6-60036 | 3/1994 |
| JP | 11-17579 | 1/1999 |

\* cited by examiner

*Primary Examiner*—Quochien B. Vuong
*Assistant Examiner*—Yuwen Pan
(74) *Attorney, Agent, or Firm*—Scully, Scott, Murphy & Presser (57) ABSTRACT

A portable terminal device of the invention has a first casing that has a first display part and a second casing that has a key operation part. The first casing and the second casing are constructed in such a form as to be rotatable around a hinge portion, which has a second display part. In a state where the terminal device is open, the first display part is visually recognizable by the user, and in a state where the terminal device is closed, the second display part is visually recognizable by the user.

9 Claims, 8 Drawing Sheets

PORTABLE TERMINAL DEVICE AND WIRELESS COMMUNICATION TERMINAL DEVICE

FIELD OF THE INVENTION

The present invention relates to a terminal device having a display part and, more particularly, to a terminal device having a plurality of display parts.

BACKGROUND OF THE INVENTION

Among portable terminals each containing therein a wireless communication device, there is a type that has a keyboard for performing smooth inputting of letters and that has a liquid crystal display part for performing production of an e-mail or browsing that has a size of 4 inches or so, and this size is relatively large for a wireless portable terminal. Most of such portable terminals are generally structured such that the casing is foldable or collapsible around a hinge portion as illustrated in FIG. 1, thereby the keyboard and liquid crystal display part are protected.

Figure 1:
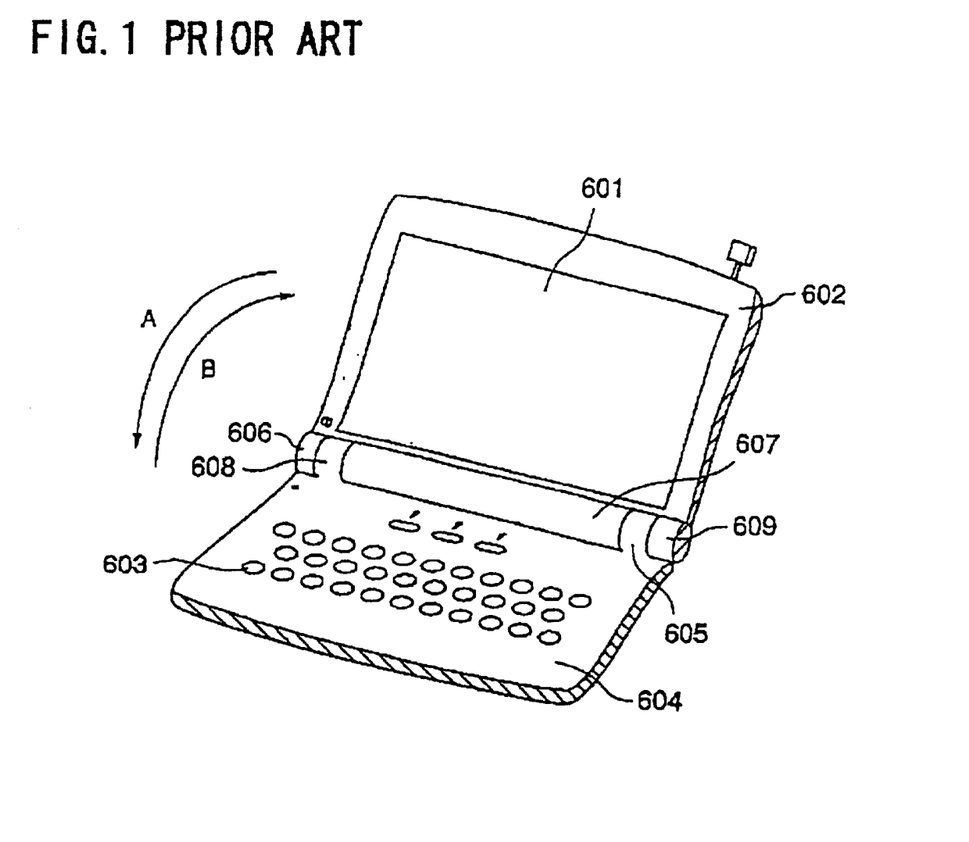
FIG. 1 is a view illustrating a conventional technique.

In FIG. 1, a portable terminal is constructed of a first casing 602 that has a liquid crystal display part (hereinafter, LCD) 601 and a second casing 604 that has a keyboard 603 for performing letter inputting. A first hinge portion 605 and second hinge portion 608, which each constitute part of the hinge, are integral with the second casing 604. Also, a third hinge portion 606, fourth hinge portion 607, and fifth hinge portion 609, which each constitute part of the hinge, are integral with the first casing 602.

And, the first casing 602 and second casing 604 are retained in such a way as to be rotatable around the hinge portions 605 to 609 in the A and B directions.

However, in the case the user walks while carrying the portable terminal, he ordinarily closes the first casing 602 in the A direction. Therefore, the contents of the display made on the liquid crystal display part 601 are concealed and therefore, unless otherwise operated, he cannot confirm those contents.

On the other hand, there is a technique that, by providing two display portions at different positions, even when unable to confirm the contents of the display made on one of the display portions, enables confirming the contents of the display made on the other of them. A portable communication device that enhances the user interface by the use of such technique is disclosed, for example, in Japanese Patent Application Laid-Open No. 11-17579.

Figure 2:
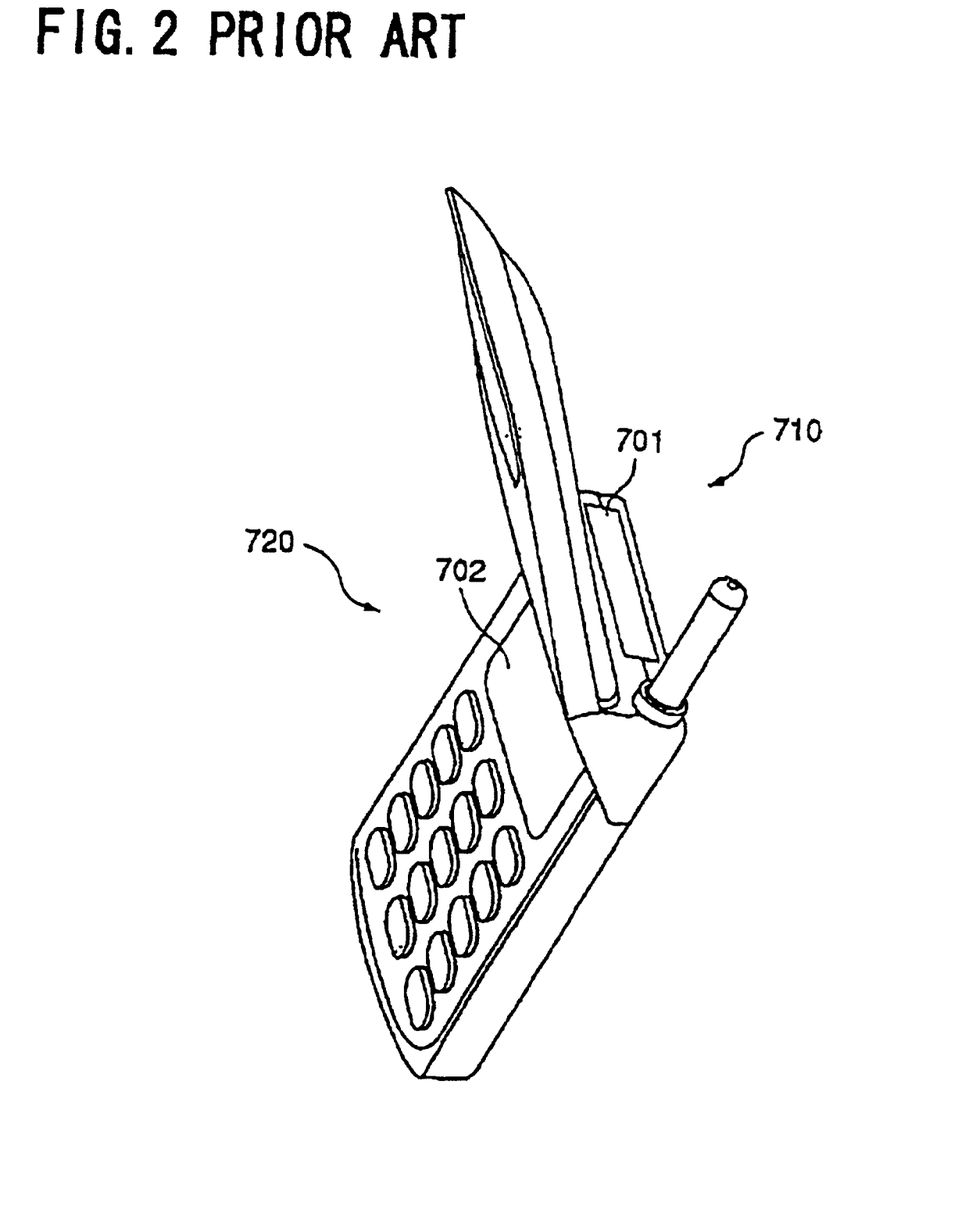
FIG. 2 is a view illustrating another conventional technique.

FIG. 2 is a view for briefly explaining the technique disclosed in the publication having the same serial number. The portable communication device has display parts 701 and 702. The display contents of the display part 701 can be visually recognized from the 710 direction, while the display contents of the display part 702 can be visually recognized from the 720 direction.

However, in the device disclosed in the publication having the same serial number, as well, there can be the circumstance that even from a position in which the display contents of one of the display parts can be confirmed the display contents of the other thereof cannot be confirmed. For example, although in FIG. 2 the display part 701 can be seen from the rear surface side of the main body of the portable communication device, the display contents of the display part 702 cannot be seen from that position.

Also, in the case of a flip-type configuration suitable for a portable telephone having a ten-key input section, according to their disposition both of the two display parts can certainly have their display contents confirmed. However, such configuration cannot be applied to the configuration suiting a portable terminal having a keyboard.

SUMMARY OF THE INVENTION

The invention of this application has been made in view of the above-described problems and an object of the invention is to provide a portable or wireless communication terminal device that can visually recognize the display contents of a plurality of display parts not only from different positions but also from the same direction.

Another object of the invention is to provide a portable or wireless communication terminal device in which at least one display part is made a movable display part.

Still another object of the invention is to provide a portable or wireless communication terminal device that can protect the movable display part while being carried.

A further object of the invention is to provide a portable or wireless communication terminal device that can prevent the relevant portable terminal, equipped with a keyboard and a relatively large image screen, from losing its appearance of its being stylish.

To attain the above object, a portable terminal device according to the invention of this application is one in which a first casing having a first display part and a second casing having a key operation part are constructed so as to be rotatable around a hinge portion, the hinge portion comprising a second display means.

The first display part becomes visually recognizable by the user only when opened, while the second display means is visually recognizable by the user regardless of whether the device is opened or closed.

Preferably, the second display means is visually recognizable regardless of whether the device is opened or closed by being retained rotatably around the rotation axis of the hinge portion.

Further, preferably, the device has detection means for detecting "open" or "close", and, according to the detection result of the detection means, there is controlled the direction of the letter displayed on the second display means.

Also, preferably, the first and second display means are driven by different drivers, respectively.

A wireless communication terminal device of the present invention is contained in a wireless communication terminal comprising an antenna part, a wireless part for performing modulation and demodulation of data of the antenna part, notification means for performing notification by means of a sound, a first display means for displaying transmission/reception data, and keys for inputting letters to the first display means, whereby the terminal is foldable by connecting two casings, which accommodate the keys and the first display portion by a hinge portion. The device comprises a second display means. The second display means is accommodated in the hinge portion and is rotatable around a rotation axis of the hinge portion jointly with a casing portion that is accommodated in the hinge portion and that accommodates therein the second display means constituting part of the hinge portion.

Also, even in a state where the terminal is folded up, it is preferable that, by rotating the second display means jointly with the casing portion, the display surface of the second display means becomes visually recognizable without opening the terminal.

Further, preferably, the device has "open"/"close" detection means for detecting whether the terminal is folded up, and display-content inversion means for vertically and horizontally inverting the contents displayed on the second display means according to the output from the "open"/"close" detection means. Thereby, between the state that the terminal is folded up and the state that it is opened, the contents (letters or characters) displayed on the second display means are vertically and horizontally reversed to each other. Namely, when the terminal is folded up, the user of the terminal can easily read the contents from the direction opposite to that in the state that the terminal is opened. Similarly, when the terminal is opened, the user can easily read the contents from the direction opposite to that in the state that the terminal is folded up. Furthermore, especially when the terminal is folded up, the contents (letters or characters) displayed on the second display means may be displayed in the longitudinal direction of the terminal in the proper order, i.e., the letters or characters displayed when the terminal is opened are each displayed rotated 90 or 270 degree after the contents are vertically and horizontally reversed.

In the invention of this application, the casing portion including the second display means constituting part of the hinge portion can be rotated around the rotation axis of the hinge portion independently of other hinge casing portions. As a result of this, when having opened the lid portion, the user can rotate the casing portion including the second display means with a rotating knob so that the contents of the display made by the second display means may be visually recognizable. On the other hand, when having closed the lid portion, the user can rotate so that the contents of the display made by the second display means may be visually recognizable. And by doing so, even in a state where the terminal is folded up, the information of the terminal can be made visually recognizable.

Also, when having closed the terminal, the user can rotate the casing portion with the rotating knob and thereby direct the second display means toward the lid portion and main body portion side. It is thereby possible to protect the display surface of the second display means.

Further, when the terminal is folded up, the contents (letters or characters) displayed on the second display means, in case of viewing from the hinge side which is nearer to its user when accessing the second display means, are inconveniently seen in the reversed direction if the contents are, as is, displayed on the second display means. Therefore, when the terminal is folded up, the direction of contents display is changed so that the contents are displayed being vertically and horizontally reversed to the direction of contents display in the case that the terminal is opened. This can enhance the easiness on visually recognizing the second display means accommodated in the hinge portion.

DETAILED DESCRIPTION OF THE PREFERRED EMBODIMENTS

The present invention will now be explained in detail with reference to the drawings.

Figure 3:
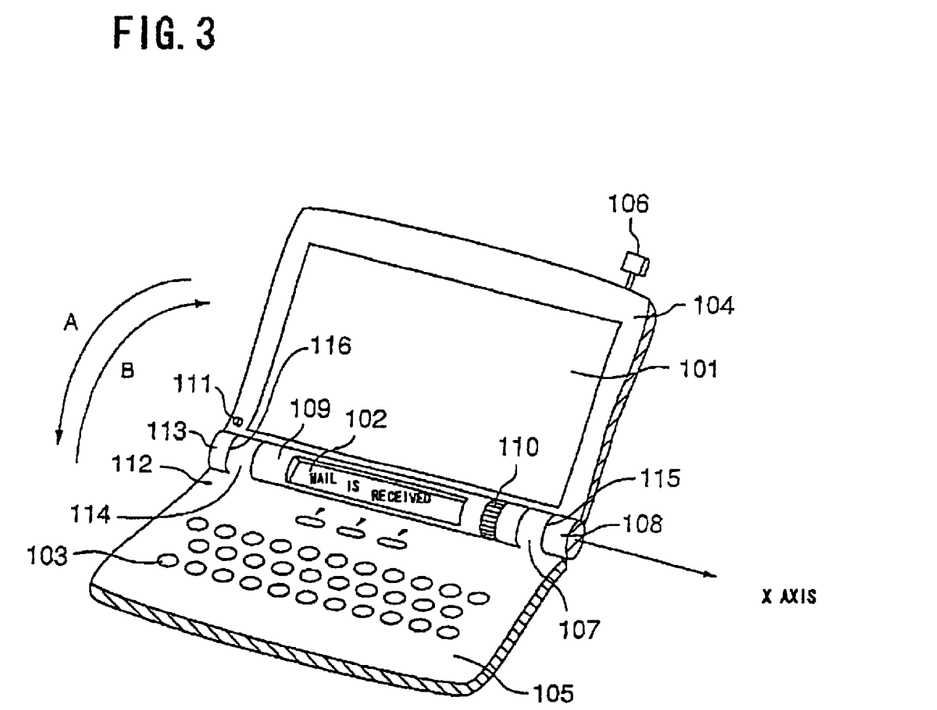
FIG. 3 is an outer-appearance perspective view illustrating a preferred embodiment of the present invention.

FIG. 3 is an outer-appearance perspective view illustrating a portable terminal device according to a preferred embodiment of the present invention.

Figure 6:
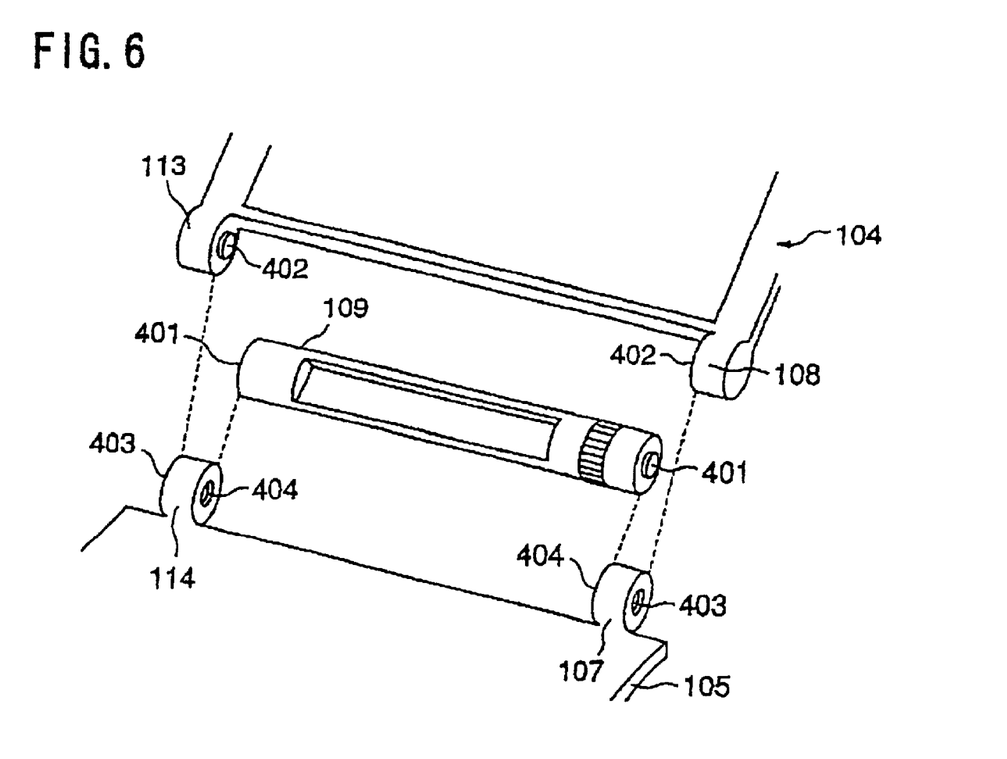
FIG. 6 is a developed perspective view of FIG. 5.

As illustrated in FIG. 3, the portable terminal device is made up into a structure wherein a first casing 104 having a first liquid crystal display part (LCD) 101 and a second casing 105 having a keyboard 103 are collapsible around a hinge portion serving as an axis. As shown in FIG. 6, the hinge portion includes a first hinge 107 and second hinge 114 that are formed integrally with the second casing 105, and a third hinge 108 and fourth hinge 113 that are formed integrally with the first casing 104. Also, the hinge portion includes a circular-cylindrical third casing or fifth hinge 109 that is constructed so as to be movable independently of the first and second casings. The hinge portion is circular-columnar, and the fifth hinge 109 has a second liquid crystal display part (LCD) 102 in its curved surface portion. Also, on a part of the curved surface portion of the fifth hinge 109 there is formed a knob 110. The knob 110 is formed by applying concavity/convexity-like working to the surface of the fifth hinge 109. When the user performs his rotation operation with his fingers in the A or B direction, the knob 110 exhibits its anti-skid effect.

The first casing 104 functions as a lid portion, while the second casing 105 constitutes a main body part. Also, the keyboard 103 corresponds to key input means by which the user performs an input operation of inputting characters, selection, or determination on the LCD image screen. However, the input means is not necessarily limited to the keyboard but may be any type of operation part that enables the performance of the input operation.

The first casing 104 and the second casing 105 are rotatable around a center axis X of the hinge portion, respectively, in the arrow-indicated A and B directions. In this case, a contact surface 115 between the third hinge 108 and the first hinge 107 and a contact surface 116 between the fourth hinge 113 and the second hinge 114 serve as border surfaces between the both casings 104 and 105.

On the first casing 104 there is provided a circular-columnar projection 111 that projects from the first casing 104. In the second casing 105 there is provided a push switch 112 at a position that when the first casing 104 is closed opposes the projection 111. Namely, the projection 111 is disposed so that when the first casing 104 has been completely closed toward the second casing 105 side (the A direction) the push switch 111 may be pushed downward.

As a portable terminal device having a wireless communication function, i.e. a wireless communication terminal, it becomes necessary to use an antenna for transmission and reception of a wireless signal. In this embodiment, an antenna 106 is formed on the first casing 104.

Figure 4:
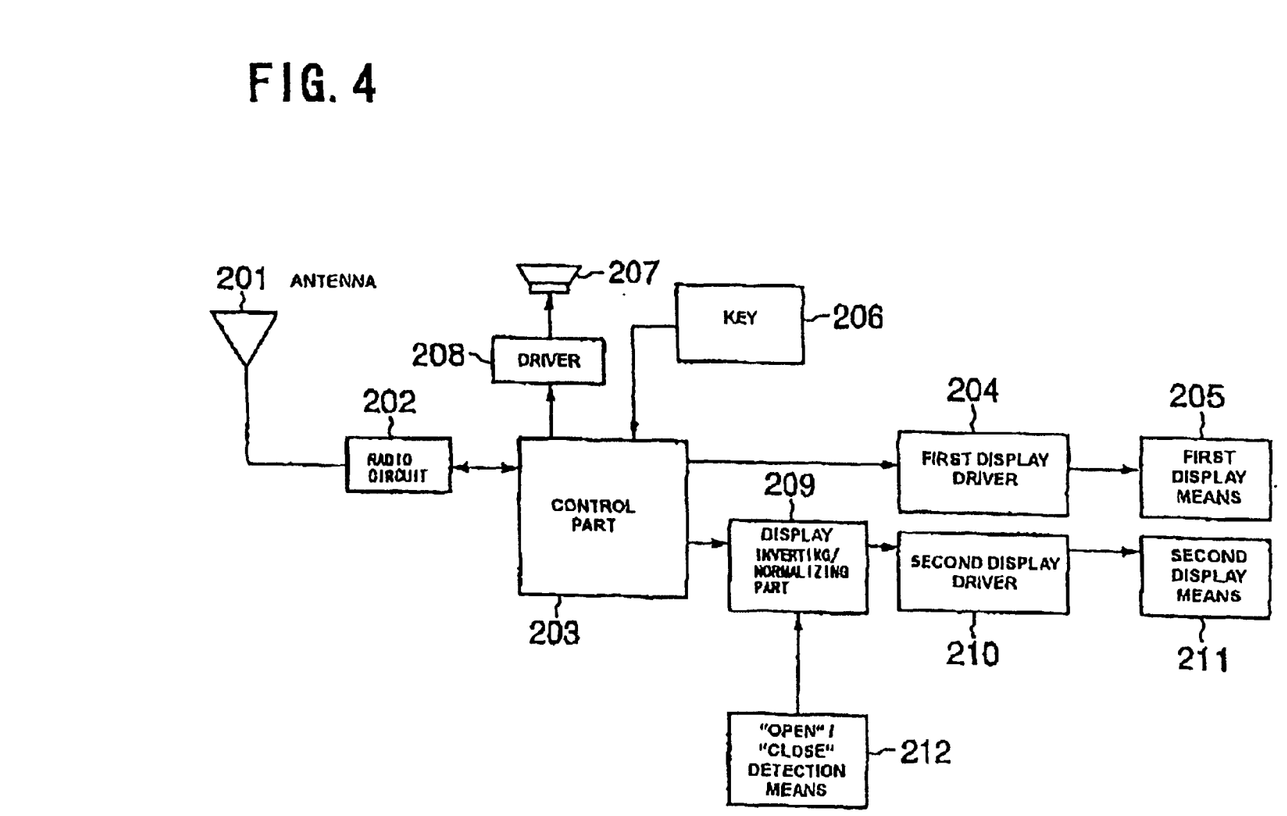
FIG. 4 is a block circuit diagram illustrating a construction of the embodiment illustrated in FIG. 3.

FIG. 4 is a block-constructional view, the block construction of that is suitable for realizing the wireless communication terminal device illustrated in FIG. 3.

An antenna 201 serves to transmit and receive a wireless signal, and corresponds to the antenna 106 in FIG. 3. A radio circuit 202 serves to perform modulation/demodulation of transmission/reception data. The radio circuit 202 performs amplification-demodulation of data received by the antenna 201 and thereby outputs the data to a control part 203 as a demodulation signal. The radio circuit 202 modulates data from the control part 203 as transmission data and thereby outputs the data to the antenna 201.

The control part 203 performs designation of a wireless channel, and control of the operation timing, with respect to the radio circuit 202, thereby the control part 203 performs transmission and reception of communication data with respect to the radio circuit 202. In addition, when detecting a call of the present user' own terminal and relevant data from among the demodulation data supplied from the radio circuit 202, the control part 203 causes the generation of a said-reception notification sound from a speaker 207 via a driver 208. The driver 208 is for the purpose of driving the speaker 207. The frequency of the sound and the amount thereof are designated by the instructions from the control part 203.

The message addressed to the present user's own terminal that has been received by it is displayed onto a first display means 205 via a first display driver 204. The first display means 205 corresponds to the display part 101 in FIG. 3. The first display driver 204 is a driver for the first display means.

A second display means 211 corresponds to the display part 102 in FIG. 3. A second display driver 210 is a drive for the second display means.

An "open"/"close" detection means 212 is constructed of the projection 111 and the push switch 112 in FIG. 3, and this detection means 212 is means for detecting the "open" or "close" between the lid portion 104 and the main body portion 105. This detection is realized by a contact/non-contact of the lid portion 104 in FIG. 3 with the main body portion 105 that occurs when the lid portion 104 has been moved in the A direction. Thereby, when the push switch 112 is not being pushed by the projection 111, an "open" detection output signal is supplied to a display inverting/normalizing part 209. When being pushed, a "close" detection output signal is supplied thereto.

The display inverting/normalizing part 209 receives display data to be displayed on the second display means 211 from the control part 203 and sets the display data onto the display driver 210. At this time, the order of the data to be stored into the second display driver 210 is changed so that, between the case that the output from the "open"/"close" detection means 212 is "open" detection and the case that it is "close" detection, the contents are displayed being vertically and horizontally inverted to each other when the display data is displayed.

Keys 206 represents user's input means by which the user inputs the letters with respect to the display means, or inputs a selection, or a determination, made from the selecting items displayed on the display means. The Keys 206 corresponds to the keyboard 103 in FIG. 3.

As the information displayed on the second display means, a piece or pieces of information regarding a reception call that is made when reception has been made are preferable. For example, a display such as that enabling visual recognition of a reception, especially a display that is made of arrival of a mail or a message, is considered as being preferable. Also, in the case the terminal has the function of timer display or electronic pocket-book, schedule information standing on the basis of time may be displayed.

Figure 5:
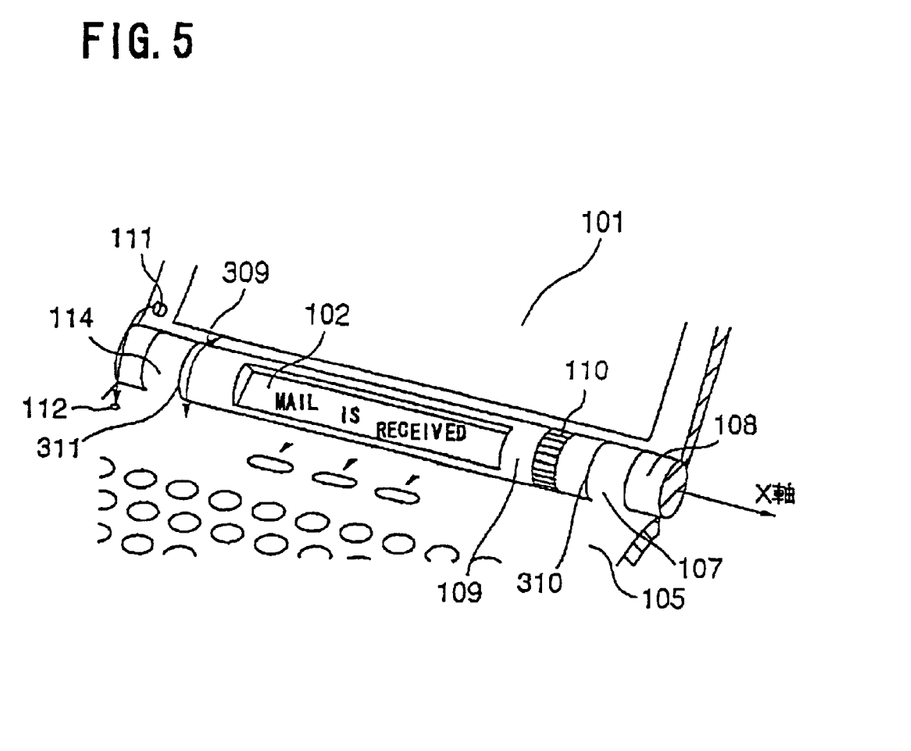
FIG. 5 is an enlarged perspective view illustrating a hinge portion and its neighborhood, illustrated in FIG. 3.

FIG. 5 is an enlarged perspective view illustrating the hinge portion 3 in FIG. 3.

In FIG. 5, the fifth hinge 109 is a casing independent of both of the lid portion 104 and main body portion 105, and the fifth hinge 109 is circular-cylindrical, the center of that is on an X axis that constitutes the center axis of the hinge portion. The fifth hinge 109 is made up into a structure that is independently rotatable with a contact surface 310 between it and the first hinge 107 and a contact surface 311 between it and the second hinge 114 serving as border surfaces.

FIG. 6 is a developed perspective view of the area neighboring upon the hinge portion that is illustrated in FIG. 5.

In FIG. 6, on each of the hinges 108 and 113 of the first casing 104 there is formed a protrusion 402 that centers at the rotation axis X. In each of the hinge 107 and hinge 114 of the second casing 105 there are formed concavity portions 403, 404. On the circular-cylindrical member 109 there are formed protrusions 401 each of that centers at the rotation axis X. The protrusions 402 of the first casing 104 are engaged, by forced insertion, with the concavity portions 403 of the second casing, respectively, while the protrusions 401 of the circular-cylindrical member 109 are engaged, by forced insertion, with the concavity portions 404 of the second casing. In this way, one of the first casing and the second casing can be made rotatable relatively to the other, while the circular-cylindrical member 109 can be made rotatable independently of the first and second casings. Regarding the electric wire distribution as well, it is possible to form a hole at or around the center rotation axis and to dispose a signal line therein, thereby the first casing, second casing, and circular-cylindrical member can be electrically connectable to one another.

It is to be noted that the structure of the hinge portion making the first and second casings rotatable relatively, to each other can be also made up in the same way as in the case of a well-known collapsible portable telephone.

Figure 7:
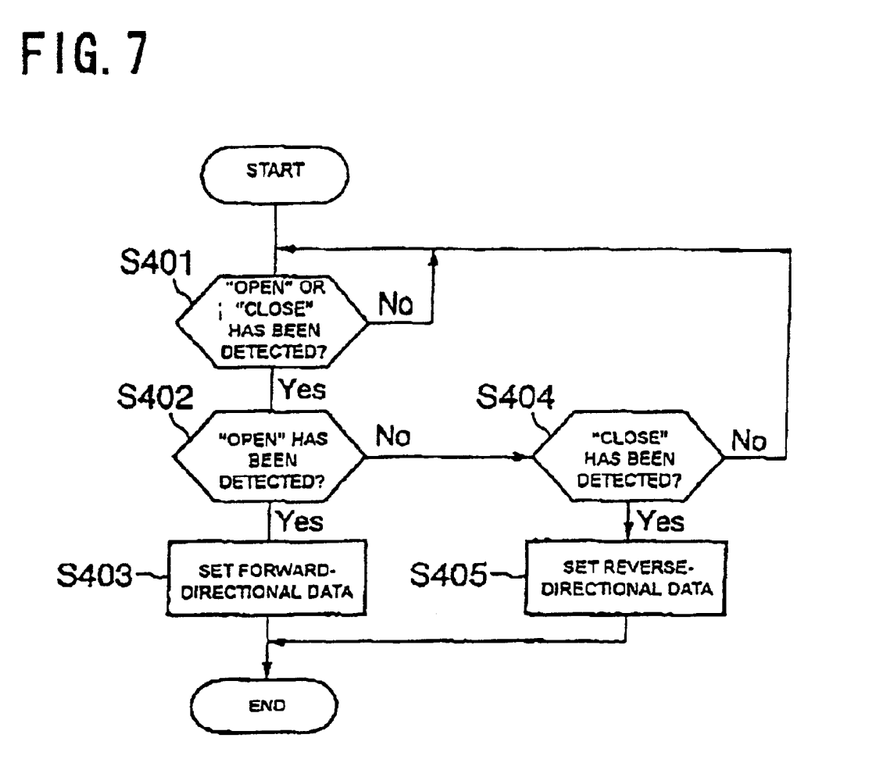
FIG. 7 is a flow chart illustrating the operation of the preferred embodiment of the present invention.

The operation regarding a preferred control of the second display means of the invention of this application will be explained using a flow chart of FIG. 7.

The display inverting/normalizing part 209 monitors the output from the "open"/"close" detection part 212 on a real-time basis (step 401). It is now assumed that the output signal line of the "open"/"close" detection part 212 has a Hi level when the detection part 212 has made "open" detection and has a Lo level when having made "close" detection. Then, by detecting the point in change of the level of the output signal from the display inverting/normalizing part 209, it is possible to monitor the output from the "open"/"close" detection part 212 in weal time. In the case detection has been made in such a way that the level of the signal line is changed from Lo level to Hi level, it results that "open" detection is made. In the case detection has been made in such a way that the level of the signal line is changed from Hi level to Lo level, it results that "close" detection is made.

When determining that the "open"/"close" detection part 212 has detected "open" detection (step S402, YES), the display inverting/normalizing part 209 sets display data to the second display driver so that the display data of the second display means maybe displayed with its lid portion 104 side being located upside as illustrated in FIG. 5 (step S403).

On the other hand, when determining that the "open"/"close" detection part 212 has detected "close" detection (step S402, NO, step S404, YES), the display inverting/normalizing part 209 sets display data to the second display driver so that the display data of the second display means may be displayed with its main body portion 105 side being located upside as illustrated in FIG. 5 (step S405)

Figure 8:
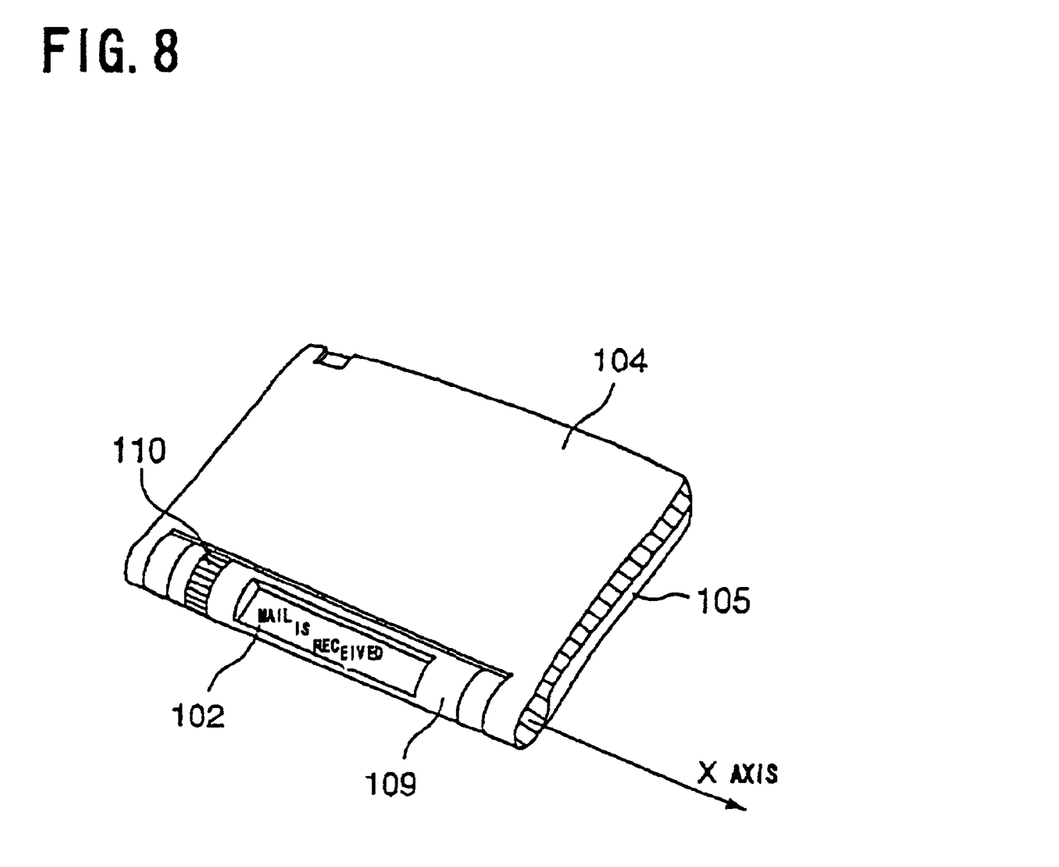
FIG. 8 is an outer-appearance perspective view illustrating a closed state of the embodiment illustrated in FIG. 3.

FIG. 8 is a view illustrating the display direction of the second display means in a state that the lid portion is closed.

This is a case that the casing 109 including the second display means is rotated around the X axis so that, even when the terminal is closed, the display surface of the second display means 102 can be seen. Since the letters or characters are displayed being vertically and horizontally inverted in comparison with those of FIG. 4, the easiness on recognizing the letters or characters displayed on the second display means when the terminal is closed can be enhanced.

As has been explained above, according to the invention of this application, the second display means is disposed on the hinge portion, and this display means thus disposed can be rotated around the center axis of the hinge independently of the hinge. As a result of this, even in the case the terminal is closed, by rotating the display surface of the second display means beforehand, it becomes possible to visually recognize the display surface of the second display means without the user troubling himself to open the terminal. Namely, the contents of the display become visually recognizable. As a result, the user's convenience to use becomes enhanced.

Also, in the invention of this application, the mere rotation of the display surface of the second display means causes the contents displayed on the second display means to be inverted when viewing them from the hinge side. So, the contents displayed are vertically and horizontally reversed between the state that the terminal is closed and the case that it is opened. Thereby, the contents can be seen in a more natural way when viewing them from the hinge side, which is nearer to its user when accessing the second display means. Therefore the easiness one recognizing the displayed contents can be enhanced.

Further, in the invention of this application, when the terminal is kept closed, the display surface of the second display means can be directed toward the lid portion side or main body portion side. It is thereby possible to prevent the display surface from being damaged or scratched.

Although the invention has been described with respect to specific embodiment for complete and clear disclosure, the appended claims are not to be thus limited but are to be construed as embodying all modification and alternative constructions that maybe occurred to one skilled in the art which fairly fall within the basic teaching here is set forth.

What is claimed is:

1. A portable terminal device comprising:
a first casing that has a first display part;
a second casing that has a key operation part, the first casing and the second casing being constructed in such a form as to be rotatable around a hinge portion; and
detection means for detecting an "open" or "close" state,
the hinge portion comprises a second display means rotatable around a rotation axis of the hinge portion jointly with an easing portion that is accommodated in the hinge portion and that accommodates therein the second display means and, according to the result of the detection made by the detection means, the direction of a letter displayed on the second display means is controlled.

2. A portable terminal device according to claim 1, wherein, in a state that the terminal device is open, the first display part is visually recognizable by the user; and in a state that the terminal device is closed, the second display means is visually recognizable by the user.

3. A portable terminal device according to claim 1, wherein the second display means is retained by the hinge portion in such a way as to be rotatable around a rotation axis of the hinge portion.

4. A portable terminal device according to claim 1, wherein the second display means displays reception information.

5. A portable terminal device according to claim 1, further comprising:
an antenna for performing transmission and reception of a wireless signal;
a wireless part that is connected to the antenna and intended for performing modulation/demodulation;
a speaker for informing a reception to the user by the generation of a sound; and
a telephone function.

6. A portable terminal device according to claim 1, wherein the first and second display means are respectively driven by different drivers.

7. A wireless communication terminal device the wireless communication terminal device being contained in a wireless communication terminal comprising:
an antenna part;
a wireless part for performing modulation and demodulation of data of the antenna part,
notification means for performing notification by means of a sound;
a first display means for displaying transmission/reception data;
and keys for inputting letters to the first display means, whereby the device is collapsible by two casings that respectively have therein the keys and the first display part being connected to each other by a hinge portion, the hinge portion comprising:
second display means, the second display means being accommodated in the hinge portion and being rotatable around a rotation axis of the hinge portion jointly with an easing portion that is accommodated in the hinge portion and that accommodates therein the second display means constituting a part of the hinge portion, the wireless communication terminal device further comprising:
"opens'/"close" detection means for detecting whether the terminal is folded up, and display-content inversion means for vertically and horizontally inverting the contents displayed on the second display means according to the output from the "open'/"close" detection means, whereby, between the state that the terminal is folded up and the state that it is opened, the contents displayed on the second display means are vertically and horizontally reversed to each other.

8. A wireless communication terminal device according to claim 7, wherein even in a state where the terminal is folded up, by rotating the second display means jointly with the casing portion, a display surface of the second display means becomes visually recognizable without the terminal being opened.

9. A wireless communication terminal device, the wireless communication terminal device being contained in a wireless communication terminal comprising:
an antenna part;
a wireless part for performing modulation and demodulation of data of the antenna part;
notification means for performing notification by means of a sound;
a first display means for displaying transmission/reception data;

keys for inputting letters to the first display means, whereby the device is collapsible by two casings that respectively have therein the keys and the first display part being connected to each other by a hinge portion, the hinge portion comprising:

a second display means, the second display means being accommodated in the hinge portion and being rotatable around a rotation axis of the hinge portion jointly with an easing portion that is accommodated in the hinge portion and that accommodates therein the second display means constituting a part of the hinge portion, the second display means having a display surface being visually recognizable even in a state in which the terminal is folded up, without the terminal being opened, by rotating the second display means jointly with the casing portion; and "opens"/"close" detection means for detecting whether the terminal is folded up, and display-content inversion means for vertically and horizontally inverting the contents displayed on the second display means according to the output from the "open"/"close" detection means, whereby, between the state that the terminal is folded up and the state that it is opened, the contents displayed on the second display means are vertically and horizontally reversed to each other.

* * * * *